United States Patent [19]
Chen et al.

[11] Patent Number: 5,943,408
[45] Date of Patent: Aug. 24, 1999

[54] FLEXIBLE DIRECT SIGNALING SYSTEM

[75] Inventors: Kuo-Wei Herman Chen, Scotch Plains, N.J.; Thomas F. La Porta, Thornwood, N.Y.

[73] Assignee: Lucent Technologies Inc., Murray Hill, N.J.

[21] Appl. No.: 08/635,800

[22] Filed: Apr. 22, 1996

[51] Int. Cl.$^6$ .............................. H04M 3/42; H04M 7/00
[52] U.S. Cl. ..................... 379/207; 379/219; 379/229; 379/209
[58] Field of Search ................................. 379/201, 207, 379/220, 221, 230, 216, 209, 229, 219; 455/466; 370/352

[56] References Cited

U.S. PATENT DOCUMENTS

| | | | |
|---|---|---|---|
| 4,897,866 | 1/1990 | Majmudar et al. | 379/201 |
| 5,473,679 | 12/1995 | La Porta et al. | 379/201 |
| 5,563,938 | 10/1996 | Soshea et al. | 379/201 |
| 5,563,939 | 10/1996 | La Porta et al. | 379/201 |
| 5,659,605 | 8/1997 | Voit et al. | 379/220 |

OTHER PUBLICATIONS

Thomas F. La Porta, Malathi Veeraraghavan, Direct Signalling: A New Access Signaling Architecture, 1995 IEEE, pp. 93–98, Feb.
Bell Atlantic, Repeat Call, Mar. 1989.
Bell Atlantic, Customer Satisfaction Guarantee, Dec. 1992.
Bell Atlantic, Identa Ring, Feb. 1993.
Bell Atlantic, Return Call, Feb. 1990.

*Primary Examiner*—Harry S. Hong
*Assistant Examiner*—Benny Q. Tieu

[57] ABSTRACT

A direct signaling system for providing system subscribers with the freedom to access service providers of their choice, regardless of their access network arrangement, with substantially minimum change to existing telecommunication software and architecture. The system provides a home interface unit and a call server that enables a subscriber to send signaling messages to and receive messages from the service providers of their choice. The home interface unit and call server execute state machines that provide specific details of system operation. The call server state machine triggers a state machine and thus operation of the service specific servers chosen by the subscriber.

27 Claims, 9 Drawing Sheets

FLEXIBLE DIRECT SIGNALING SYSTEM

FIELD OF THE INVENTION

This invention relates to communications systems.

BACKGROUND OF THE INVENTION

In today's telecommunications environment, there are many value-added services available to subscribers. This includes information altering services such as speed dial and distinctive ring, and transport altering services such as call forwarding and call waiting. In current telecommunication systems, a caller has access only to the value-added services that are provided by the transport provider to which the caller subscribes. The transport provider is the service that handles the switching of the information communicated from the calling party to the receiving party. As a result, any service not provided by the transport provider is not available to the caller. Thus, the current telecommunication environment limits a subscriber's ability to freely select these services and prevents subscribers from freely mixing and matching features from different carriers on a call by call basis or on a subscription basis. Moreover, current systems do not enable end-users, who have access/egress facilities to multiple competing carriers, to specify a particular carrier from which they want to receive incoming communications services.

The main cause of this limiting aspect of present day systems is the rigid communications environment dictated by the communication system architecture. This rigid environment is illustrated in the architecture of modem Integrated Services Digital Networks (ISDNs). A simplified view of the current architecture for ISDN is shown in FIG. 1. As shown, a subscriber can signal into the network to request calls (i.e. services and connections) through the User-Network Interface (UNI). This is done using the Digital Subscriber Signaling System No. 1 (DSS1) protocol suite over a dedicated point-to-point signaling link called the D-channel. The D-channel, and the entire DSS1 protocol suite, is terminated on the access switch to which the subscriber is physically connected. The user information, such as voice, travels over a separate logical channel, called the B-channel. Both the B- and D-channels occupy the same physical transmission media. See FIG. 2 for a simplified view of the ISDN message flow.

Within a network, nodes signal to each other across the Network Node Interface (NNI) using the Signaling System No. 7 (SS7) protocol suite over a common channel signaling network. The common channel signaling network consists of packet switches, called Signaling Transfer Points (STPs), that interconnect intelligent nodes and switches in a highly reliable configuration. Signaling information is transported between processors through different switches, and likely different transmission media, than the user information. The signaling messages, however, are routed to and processed within the switches that will eventually support the connection carrying the user information. Consequently, in present day systems, the routing of the signaling messages is dependent on the route of the user connection.

It is this relationship which allows only the providers supplying the transport service of the user information on a particular call to offer the signaling dependent services on that call (i.e. automatic call back, distinctive ring/call screening, speed dial, and repeat dial). As described above, this limits the subscriber's choices of services and service providers. That is, the subscriber may only choose services that are available from its transport provider.

A solution to this problem, called direct signaling, was presented by T. LaPorta and M. Veeraghavan in an article entitled "Direct Signaling: A New Access Signaling Architecture," in Proc. IEEE ICC '95, Seattle; Wash., 1995. Basically, direct signaling provides the ability to route and process signaling information independent of the transport information for a particular call. As a result, through a direct signaling architecture, subscribers can send their signaling messages to request services and connections directly from any service provider, independent of their particular access transport provider. Likewise, subscribers may receive signaling messages, and hence services, from any service provider for incoming calls, independent of their access transport provider. Consequently, the direct signaling approach enables subscribers to choose from a variety of service providers for their signaling services, without having to subscribe to each provider individually for a particular call.

One implementation of the direct signaling approach was disclosed in U.S. Pat. No. 5,473,679 issued to La Porta et al. on Dec. 5, 1995 (hereinafter LaPorta '679), and incorporated herein by reference. LaPorta '679 recognized that the root cause of the aforementioned prior art limitations on value-added service selection is the dependency of end-user signaling systems on end-user switching points. Specifically, the end-user switching points originate, process and terminate signaling messages for end-user devices. Because of that dependency, the end points for user signaling are switching systems that are generally managed and owned by a single communications carrier, such as a Local Exchange Carrier (LEC), a cellular communications provider or a cable television operator. Thus, the communications carrier that controls the local loop associated with the terminal device of a subscriber also controls the nature and type of signaling messages for all communications services received and requested by that subscriber over that loop. Hence, La Porta '679 recognizes that a subscriber in present day systems is at the mercy of the loop-controlling communications carrier (transport provider) for the type of communications services and features available to that subscriber.

As a result, La Porta '679 disclosed a communication network architecture in which, a subscriber is allowed to select a signaling provider independently of a) the transport carriers which control the local loops (transport providers) for particular communication services, and b) the providers of those services. Basically, the architecture enables bi-directional signaling messages associated with communications services requested by, or destined for a subscriber's terminal device to be sent unprocessed to a signaling provider selected by the subscriber. The signaling provider then requests those services from the specific service providers selected by the subscriber.

To achieve this, La Porta '679 describes a new telecommunications architecture wherein the user establishes a signaling connection to a node of a signaling provider of his or her choice via a transport provider network. The signaling provider node processes call setup signaling messages to determine the type of connections and services desired by the user, and then retrieves a profile associated with the terminal device or user-identification information contained in a signaling message. Through a look-up table operation, the profile identifies the particular features and service providers selected by the user, on a call by call basis or on a subscription basis. Once the appropriate service providers have been identified, the signaling provider node initiates and transmits service request signals to each of the signaling nodes of those service providers networks to obtain the requested services and establish the appropriate connections for the user's call.

To implement the La Porta '679 direct signaling system in current systems, however, would require substantial hardware changes/additions to both the local transport provider network and all the switching nodes along the communication path. More specifically, a MUX/DEMUX switch would have to be installed at each transport provider (i.e. LEC), a signaling service provider node (SSP) would have to be added to each signaling service provider, and a signaling service node (SSN) would have to be added to each service provider along the communication path. Thus, it would be substantially costly to incorporate the La Porta '679 system into the architecture of present day systems.

Another implementation of the direct signaling approach was disclosed in pending application Ser. No. 08/164521, filed by La Porta et al. on Dec. 9, 1993 (hereinafter La Porta '521), and incorporated herein by reference. La Porta '521 discloses another network architecture for providing direct signaling. Basically, LaPorta '521 calls for the integration of a signaling transfer device (STD) in the system architecture. The STD is electrically coupled between the subscriber device and the carrier network to which the subscriber communicates. For outgoing calls, the STD detects signaling indicia generated by the subscriber device and forwards those signaling indicia to a signaling provider network via the access facilities of a selected communications network. Upon receiving the signaling information, the signaling provider network processes that information, and returns to the STD other information that is used for the delivery of the communications to the user. Thus as with the La Porta '679 architecture, to implement the La Porta '521 system in present day systems would require substantial hardware costs.

Moreover, neither the LaPorta '679 nor the LaPorta '521 system disclose specific details of how the direct signaling procedures are actually implemented. La Porta '679 describes the use of a MUX/DEMUX switch and a SSP node, but does not give the specifics of the operation of these hardware devices. Similarly, La Porta '521 describes hardware implementations, but no details of their operation (e.g. how the system actually provides the value-added services to the subscriber on a particular call).

SUMMARY OF THE INVENTION

Accordingly, the present invention is directed to a direct signaling method and architecture for providing subscribers with the freedom to access service providers of their choice, regardless of their access network arrangement, with substantially minimum change to existing telecommunications structure or software. To attain this, the present invention provides a home interface unit and a call server that enable a subscriber to send signaling messages to and receive messages from a service provider of their choice, regardless of the subscriber's access network arrangement.

In general, each subscriber has a home interface unit (HIU) which handles all the signaling and user information associated with each call of a particular premises equipment. The HIU interfaces with the call server which is the heart of the direct signaling system. The call server invokes and coordinates all services provided to the subscriber, and thus is responsible for all signaling transactions with the subscriber premises equipment. The call server receives all outgoing call and service requests, and all incoming call requests. As a result, the call server ultimately requests connections from the transport provider network on behalf of the subscriber.

To accomplish this, the call server operates according to a state machine that it executes for each subscriber it serves. That is, after each input event from the home interface unit, caused by either an action of the subscriber or the network, the call server performs certain processing according to the call server state machine. As a result, depending on the subscriber or network actions, the call server may invoke and coordinate actions in the service specific servers, wherein the actions for each service specific server is dictated by a predetermined state machine for that service.

This means that for each subscriber involved in a call, the call server may interact with a state machine in a service specific server which provides a particular service to that subscriber. Thus, after each input event from the HIU, caused by either an action of the user or the network, the call server performs certain processing and may invoke and coordinate the running of a state machine in the service specific servers which may execute on different processors or on the same processor. As a result, communications may require passing messages between the processors, and a sharing of variables by passing parameters within the interprocessor messages.

Consequently, the direct signaling system of the present invention implements system functions substantially through software, rather than through costly hardware as with the prior art. In addition, the present invention provides specific system operation for the various services provided to the subscribers. Thus, the present invention overcomes, to a large extent, the limitations associated with the prior art. These and other features of the invention are described in more complete detail in the following detailed description of embodiments of the invention when taken with the drawings. The scope of the invention, however, is limited only by the claims appended hereto.

DETAILED DESCRIPTION OF ILLUSTRATIVE EMBODIMENTS OF THE INVENTION

Figure 1:
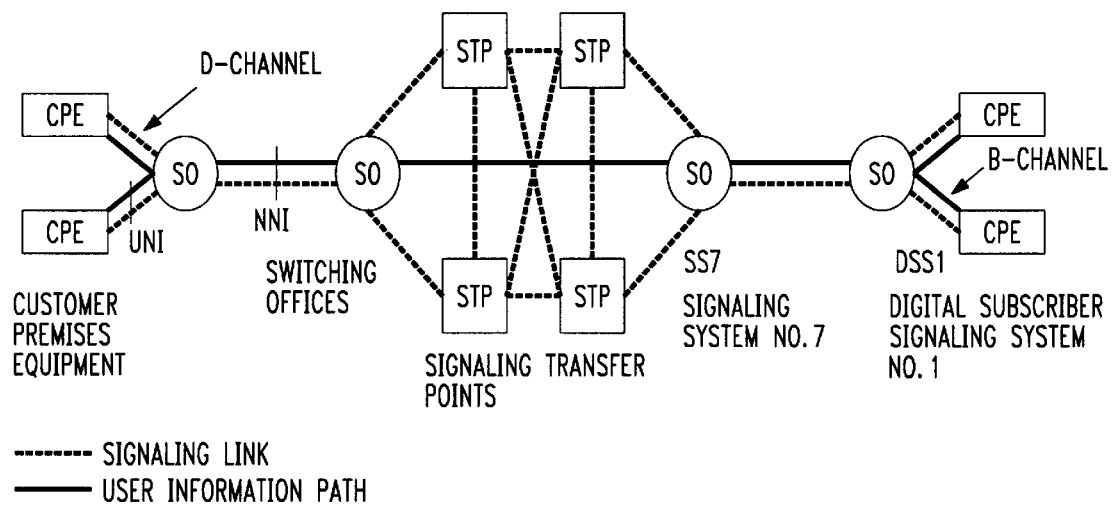
FIG. 1 is block diagram of the signaling architecture of modern Integrated Services Digital Networks (ISDN's).
Figure 2:
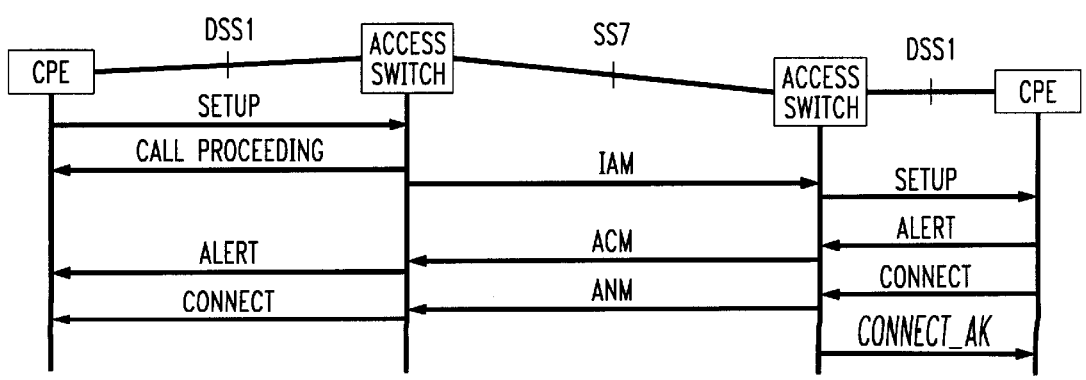
FIG. 2 is a diagram of the message flow of the ISDN architecture shown in FIG. 1.
Figure 3:
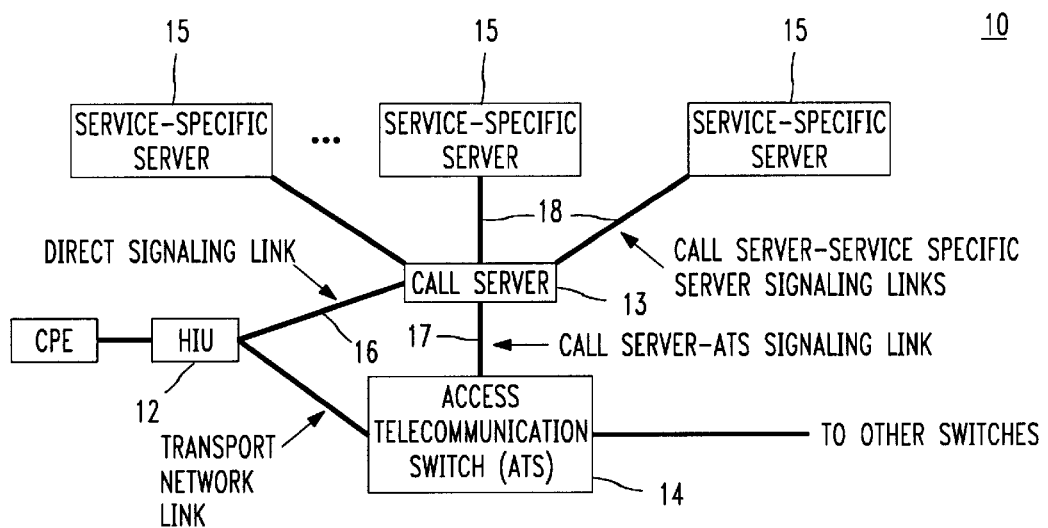
FIG. 3 is a block diagram of direct signaling architecture arranged in accordance with the principles of the present invention.

Referring now to FIG. 3, there is shown a preferred embodiment of the direct signaling architecture according to the principles of the present invention, herein after referred to as direct signaling architecture 10. As shown, customer premises equipment 11 is electrically coupled to home interface unit 12. Home interface unit (HIU) 12 is electrically coupled to call server 13 and access telecommunication switch (ATS) 14. Call server 13 is further electrically coupled to service-specific servers 15 and ATS 14. ATS 14 is further electrically coupled to other switches (not shown).

Customer premises equipment 11 may be a simple telephone handset which affects the services available to a subscriber. That is, the capabilities of CPE 11 may limit the services available to the subscriber using the CPE. For example, if the CPE 11 does not provide a display, the number of the calling party can not be delivered to a subscriber requesting caller id services. In general, however, the vast majority of telecommunication services may be offered to subscribers independent of the CPE they use to communicate over the network.

Call server 13 is the heart of the direct signaling system of the present invention. All signaling transactions for CPE 11 involve call server 13. That is, call server 13 is responsible for invoking and coordinating all services provided to the subscriber. Server 13 receives all outgoing call and service requests, and all incoming call requests. In addition, call server 13 ultimately requests connections to the transport provider network on behalf of its subscribers.

Home interface unit 12 terminates the transport provider and signaling service provider connections with CPE 11. Unit 12 routes signaling information between CPE 11, call server 13, and the transport provider network. In addition, unit 12 routes user information, such as voice, fax, or voice-band data, to the transport network via access telecommunication switch 14. Home interface unit 12 supports interfaces for CPE 11, the transport provider network, and a direct signaling link 16 to call server 13.

Direct signaling link 16 provides transport for signaling messages between home interface unit 12 and call server 13. Link 16 can be any type of communication link, including a Cellular Digital Packet Data (CDPD) link, an internet connection, a cable TV connection (CATV), a packet network link, a phone line, and a wireless link.

Access telecommunication switch 14 provides the basic switching function to the subscriber. Depending on the level of coordination between service providers 15, switch 14 has varying functionality. At a minimum, switch 14 provides basic routing and transport of user information.

Service specific servers 15 execute the service logic programs that provide services to the subscribers. For example, one service specific server 15 may provide the translation functions for an 800-number or a speed dial service. Communication between call server 13 and service specific servers 15 is carried out over highly reliable communication links 18. Ideally, call server 13 is directly connected to the service specific servers 15 from which services are to be accessed. However, in some cases, call server 13 and service specific servers 15 may communicate over a packet network, such as the Signaling System No. 7 networks used in modem telecommunication networks.

System 10, shown in FIG. 3 has a direct link 17 electrically connecting call server 13 and access telecommunications switch 14. Link 17, along with the protocol defined for this interface, directly affects the performance of direct signaling system 10 and the services offered thereon. That is, the procedures for simple calls in direct signaling system 10 are directly dependent on link 17. As a result, depending on the existence of link 17 between call server 13 and ATS 14, the direct signaling system of the present invention will provide varied performance and/or offer different services. The performance of system 10 (having a link 17) is compared to another embodiment of the present invention, wherein no link 17 exists between the call server and the ATS, below. In comparing each embodiment, the Digital Subscriber Signaling System No. 1 (DSS1) of ISDN is used to signal between the subscriber and the network, the ISDN User Part (ISUP) of SS7 is used to signal between switches.

Figure 4:
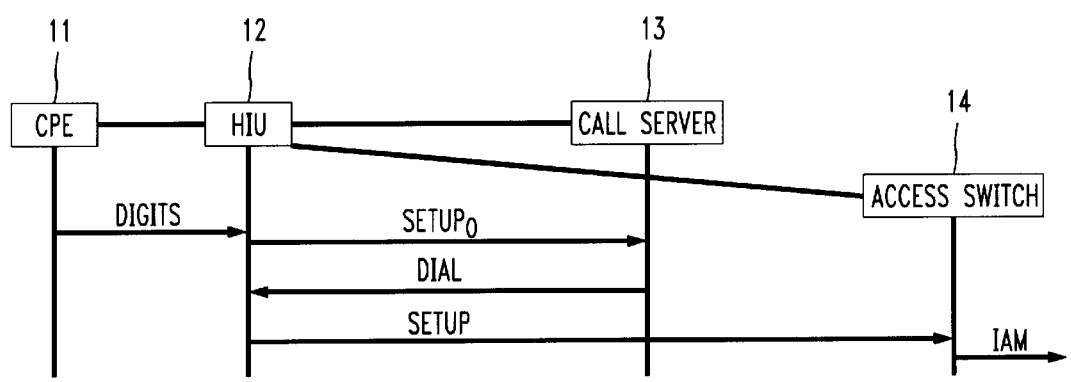
FIG. 4 is a diagram of the message flow of an outgoing call for the architecture of FIG. 3, without a call server-access switch signaling link.

FIG. 4 shows the outgoing call signaling procedure for an embodiment of a direct signaling system of the present invention, wherein no signaling link 17 exists between call server 13 and access telecommunication switch 14. As shown, a user dials the digits of the party with which they wish to communicate to initiate a call. HIU 12 intercepts the digits and routs them to call server 13 for the calling subscriber (SETUP$_O$). The SETUP$_O$ message contains the digits of the calling party and the called party. Note that for certain services, the called party number may be replaced with a special dial code (such as *66 for repeat dial) or alias for the user (such as a speed dial code or 800 number).

Call server 13 analyzes the dialed digits, invokes any services required for the call, and instructs home interface unit 12 to place a call through access telecommunication switch 14 to the called party (DIAL). The DIAL message includes the telephone number of the called party. Home interface unit 12 then signals to access telecommunication switch 14 to establish the connection (SETUP). The SETUP message contains the digits received in the DIAL message. The access switch 14 routes the connection to the terminating switch (IAM) using standard SS7 procedures. The call establishment then proceeds in normal fashion.

Figure 5:
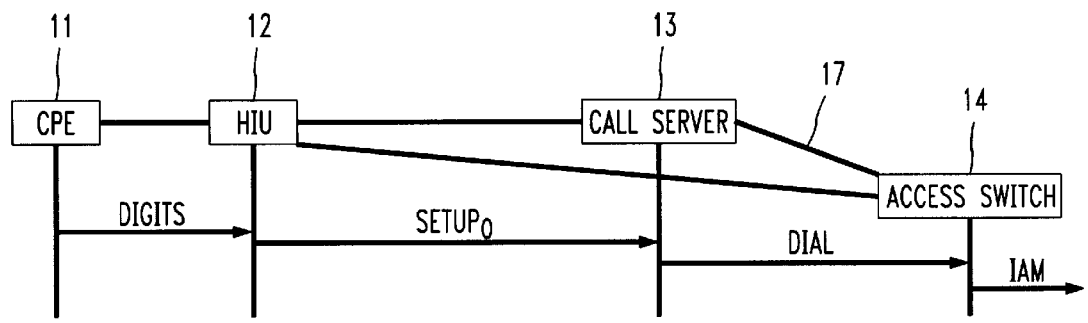
FIG. 5 is a diagram of the message flow of an outgoing call for the architecture of FIG. 3, with a call server-access switch signaling link.

FIG. 5 shows the outgoing call signaling procedure for an embodiment of the direct signaling system of the present invention, wherein a link 17 exists between call server 13 and access switch 14. As shown, instead of routing the DIAL message to home interface unit 12, call server 13 requests a connection directly from the access switch 14. This reduces the number of signaling messages as compared to the embodiment wherein no link 17 exists, as described above. Thus, link 17 reduces system 10's dependency on the performance of the direct signaling link technology. Moreover, since call server 13 requests connection services only, link 17 eliminated the need for switch 14 to execute a state machine to check for service logic triggers. To achieve this, however, an interface is required to provide third party connection control from the access switch 14.

Figure 6:
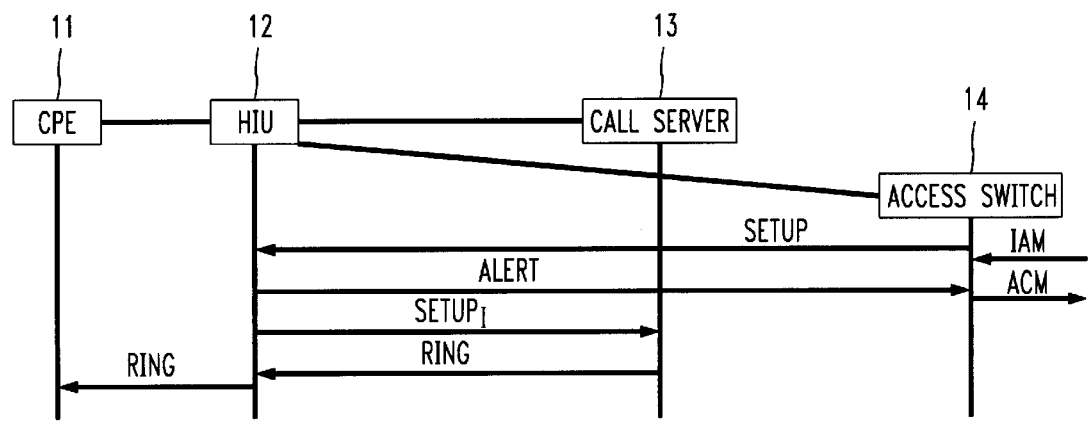
FIG. 6 is a diagram of the message flow of an incoming call for the architecture of FIG. 3, without a call-server-access switch signaling link.

For incoming calls, the case in which no link exists between the call server and the access switch is shown in FIG. 6. As shown, a call is delivered to the customer premises using standard SS7 procedures. The SETUP message, which would normally cause the subscriber CPE to alert (i.e., the phone to ring), is intercepted by home interface unit 12 and routed to call server 13 (SETUP$_I$). Call server 13 invokes any terminating call services, such as distinctive ring, call screening, etc., and then instructs home interface unit 12 to alert the user (RING). The RING message contains information related to the ring-type. Home interface unit 12 then rings the CPE 11 and connects CPE 11 to access switch 14 so that the end-to-end connection between the calling and called party is complete.

Figure 7:
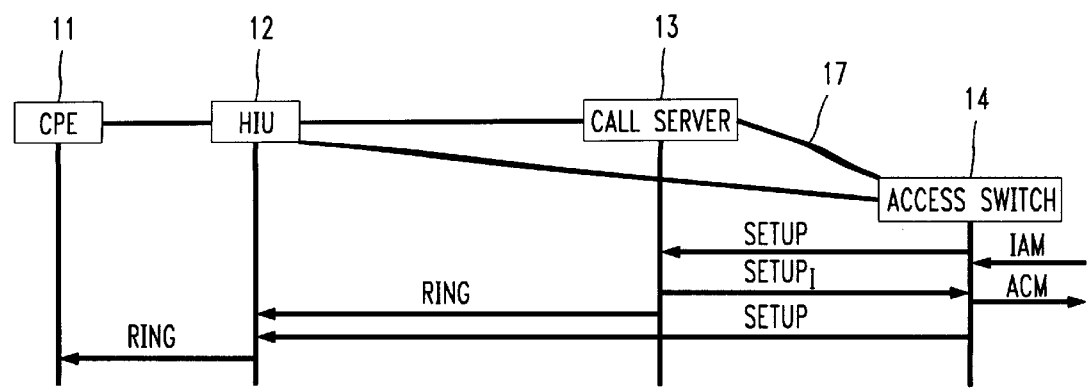
FIG. 7 is a diagram of the message flow of an incoming call for the architecture of FIG. 3, with a call server-access switch signaling link.

If, however, a link 17 exists between call server 13 and access switch 14, this flow may be modified as shown in FIG. 7. As shown, access switch 14 of the called party notifies the call server 13 directly when an incoming call for a subscriber arrives. After providing service processing, call server 13 instructs the access switch 14 to complete the connection (SETUP$_I$) and instructs the home interface unit 12 to alert the CPE 11. Thus, as described above for outgoing calls, link 17 enhances system performance.

The major concern with direct signaling systems is the system performance, including the time needed to establish connections on the system, and the number of services it can support. Present day systems place limitations on the number and types of services that are provided to the subscriber. For example, in present day systems a signaling service provider has access to only certain information about the call, and thus has no direct control over communication resources. In a direct signaling system of the present invention, however, information-affecting services such as speed dial, distinctive ring, etc. can be offered no matter what transport service provider is used. This is mainly due to the minimal dependency of the signaling service provider on the transport service provider.

Since, however, resource affecting services such as call waiting or call forwarding can only be offered by the service provider that controls the transport resources, direct signaling provides no benefit to subscribers over present day systems. For example, call server 13 can not forward a call unless the interface to invoke this capability is offered on the access switch serving its subscriber. As a result, system 10 and the present invention is not directed to providing such services.

The operation of the present inventive system involves the interaction between the subscriber equipment, the home interface unit, the call server and the various service specific servers. As a result, the operation and machine logic of four service specific servers (automatic call back, distinctive ring, repeat dial and speed dial) and how these services are provided through the call server and the home interface unit is described below. That is, the detailed design and operation of the call server, the home interface unit, and the four service specific servers, during the execution of each of these services, are described below.

In operation, call server 13 executes a state machine for each user it serves that is involved in a call. Generally, after each input event from the home interface unit, caused by either an action of the user or the network, the call server performs certain processing and makes certain state transitions according to that state machine. Thus, as part of its processing, the call server invokes and coordinates actions in the service specific servers.

The state-machines for the four services (automatic call back, distinctive ring, repeat dial and speed dial) are shown in FIGS. 8–13. In each machine, a specific state is shown as a bubble, with transitions between states shown as arcs. The labels on the arcs identify the input events and conditions that enable the transitions, outputs, and variable assignments that are generated therefrom. The notation x!y indicates that message y is being sent to entity x. The notation x?y indicates that message y is being received by entity x. Entity x may be another server or another state machine executing in the local server. Other notation used includes x===y, which indicates an equivalency test between x and y, x!=y to test for inequality, and x:=y, which indicates that the variable x is set to the value y. The Boolean AND and OR operators are represented by * and + respectively.

In one embodiment of the invention, the state machines for different servers may execute on difference processors, wherein communication is performed by passing messages between the processors. In such an embodiment, parameters are passed within the inter-processor messages to share the variables of the state machines.

Figure 8:
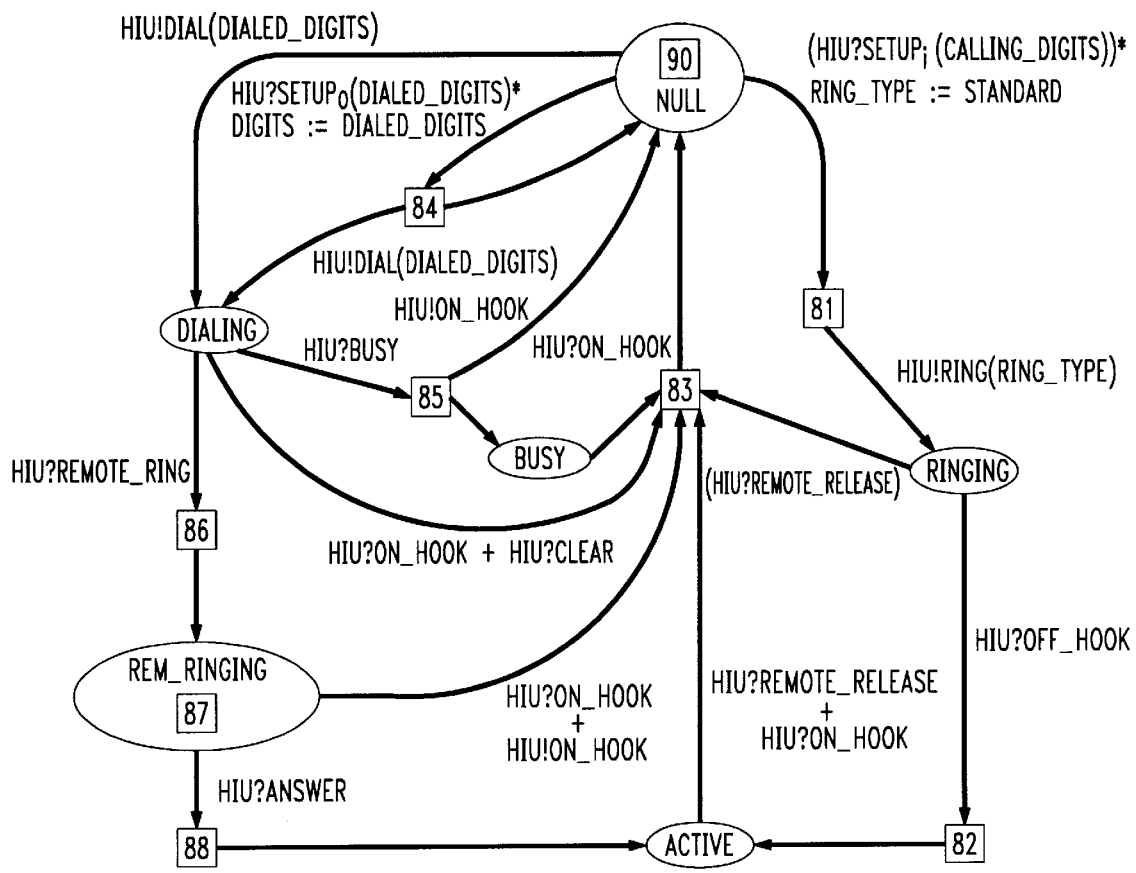
FIG. 8 is a state machine for the call server of the architecture shown in FIG. 3.
Figure 9:
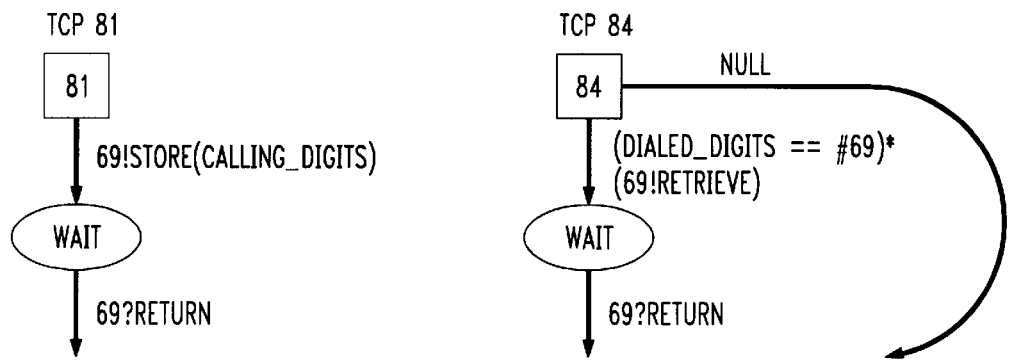
FIG. 9 is a diagram of the state machine for an automatic call back service as implemented into the architecture shown in FIG. 3.

One embodiment of the state-machine for call server 13 is shown in FIG. 8, hereinafter referred to as machine 80. The inputs to and outputs from machine 80 are briefly described in Table 1. The entities with which the call server state machine communicates are the home interface unit 12 and the service-specific servers 15. Before any transition in machine 80 is executed, a trigger control point (tcp) is checked to determine if any service specific processing should be activated. The tcps are shown as boxes on the transition arcs in FIGS. 8–12. Note that for a tcp to be checked, the input event and conditions enabling the transition must be true. If a tcp is not triggered, the transition occurs normally. If the tcp is triggered, control is passed to a state machine executing for a specific service for processing. As a result, control is passed by the tcp invoking an operation in the service specific server. That is, messages containing relevant parameters are sent to the service specific server to invoke operation of that servers state machine. The service specific state machines pass values back to the tcps in the their reply messages. The tcps then overwrite the variables maintained in the call server. The various tcps are shown in FIGS. 9–12.

The call server state machine, shown in FIG. 8, differs from an Intelligent Network Basic Call State Model (IN BCSM) in two major respects. First, in the IN BCSM, separate machines are designed for incoming and outgoing calls. In the present invention, one machine

| input/output | description |
| --- | --- |
| setup$_1$ | indicates an incoming call; contains calling party number as calling digits |
| ring | commands HIU to ring user CPE with ring of ring_type |
| off_hook | indicates the local user phone is off hook |
| remote_release | indicates the remote user has gone on hook |
| on_hook | indicates the local user has gone on hook/commands HIU to force local user on hook |
| setup$_0$ | indicates an outgoing call with dialed digits |
| dial | commands HIU to dial dialed digits |
| busy | indicates that the remote user phone is busy |
| clear | indicates that the call is cleared |
| remote_ring | indicates remote phone is ringing |
| answer | indicates remote phone has been answered | is used to account for outgoing services that interact with incoming services, and vice versa. In addition, the IN BCSM contains states and actions that are related to connection control, and the direct signaling state machine deals only with call control, including the invocation and coordination of services.

In isolation, machine 80 provides access to basic connection services. For example, when a user dials a phone number, machine 80 receives an outgoing call request message (hiu?setup$_O$) from the home interface unit 12. If tcp 84 is not triggered, call server state machine 80 commands the HIU 12 to dial the called digits (hiu!dial(dialed_digits)), and enters the dialing state. If the remote phone rings, the call server receives an indication (hiu?remote_ring) from the HIU 12, and enters the rem_ringing state. Finally, when the remote user answers the call, the call server receives notification (hiu?answer) and transitions into the active state. The transitions for the reception of an incoming call and the release of a call can also be traced through FIG. 8.

To add any services, tcps in the call server state machine are modified to reflect the need for service specific processing. In many cases, as will be examined below, several services require modifications to the same tcp. In these cases, the modifications to the tcp reflect both the required service processing and service interaction. The state machines for the speed dial, distinctive ring, automatic call back, and repeat dial services are described below. This includes the service logic as well as any modifications to the tcps of the call server state machine. The act of combining the tcp resolves problems associated with interactions between these services.

Figure 11:
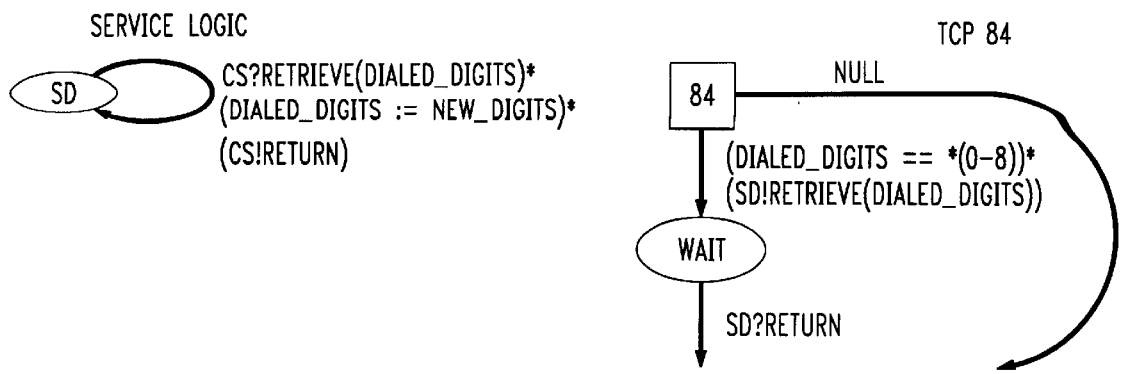
FIG. 11 is a diagram of the state machine for a speed dial service according to the present invention.

The automatic call-back service allows a user to automatically call the last number from which it received an incoming call. To invoke the service, in one embodiment, the user enters the digits #69. The processing logic for one embodiment of this service, as well as its modifications to the tcps of the call server state machines are shown in FIG. 11. As shown, this service requires two actions: storing the phone number of calling parties for incoming calls, and retrieving the number when the local user dials #69.

To store the number, the service logic in the automatic call back server is activated from tcp 81 of the call server state machine (69!store(calling_digits)). Tcp 81 is reached when the call server receives the indication of an incoming call along with the number of the calling party. The automatic call back server stores the calling number and returns control to the call server state machine (cs!return) for the normal transition to complete.

To retrieve the number after a user dials #69, the automatic call back logic is invoked from tcp 84 of the call server state machine (69!retrieve). Tcp 84 is reached when the call server state machine receives an outgoing call request with the dialed digits. Note that tcp 84 is only triggered if the dialed digits are #69 (dialed_digits==#69). The automatic call back logic retrieves the number and returns the value to tcp 84 which overwrites the dialed_digits variable of the call server state machine. At this time, the call proceeds in a normal fashion.

The distinctive ring/call screening service allows the user to pre-specify a ring pattern for incoming calls from a certain number. As part of the service, the user can specify that no ring be provided, thus effectively screening the incoming call. Procedures which have been defined and implemented to enable a user to enter their distinctive ring selections are not described herein.

Figure 10:
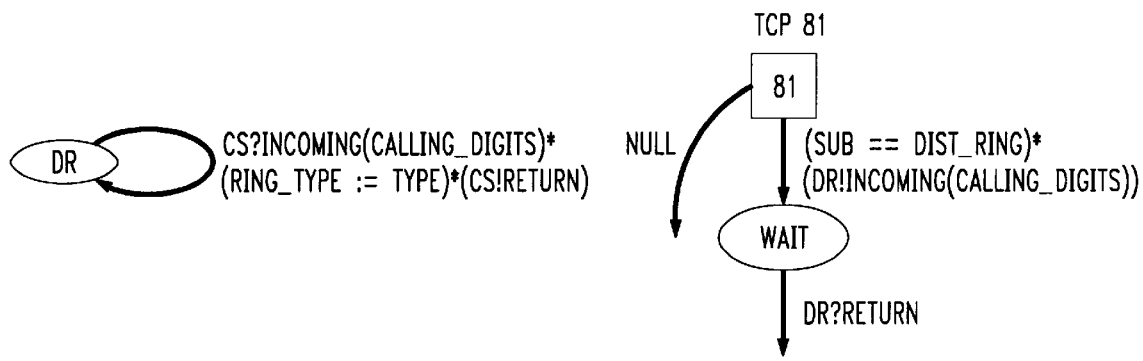
FIG. 10 is a diagram of the state machine for a distinctive ring/call screening service as implemented into the architecture shown in FIG. 3.

One embodiment of the processing logic for the distinctive ring/call screening service, along with its modifications to the call server tcp, is shown in FIG. 10. As shown, the service logic for this service is activated from tcp 81 of the call server state machine. It is at the point that the call server state machine has received an incoming call request with the calling party number. If the called party subscribes to the distinctive ring service (sub dist_ring), tcp 81 triggers the distinctive ring/call screening service logic (dr!incoming (calling_digits)). The distinctive ring logic retrieves the ring pattern for the calling number and returns with the value to tcp 81 (cs!return) which overwrites the ring_type variable maintained by the call server state machine.

The speed dial service allows a user to enter a short alias for a party it wishes to call, instead of the entire called party number. The service expands the alias into the full number and completes the call. One embodiment of the processing logic for speed dial, and the modifications to the call server state machine tcp are shown in FIG. 11. Procedures for allowing a user to enter speed dial codes into the system have been designed and implemented, and are not presented herein.

As shown, the service logic for the speed dial service is activated from tcp 84 of the call server state machine. It is at this point that the call server machine has received the outgoing call request with the dialed digits. If the dialed digits are a valid speed dial code (e.g. dialed_digits ==* (0–8)), tcp 84 passes control to the speed dial logic (sd!retrieve(dialed_digits)). The speed dial logic translates the speed dial code to the number of the party which is being called, and returns the value to tcp 84 (cs!return) which overwrites the dialed_digits variable of the call server state machine 80.

Figure 12:
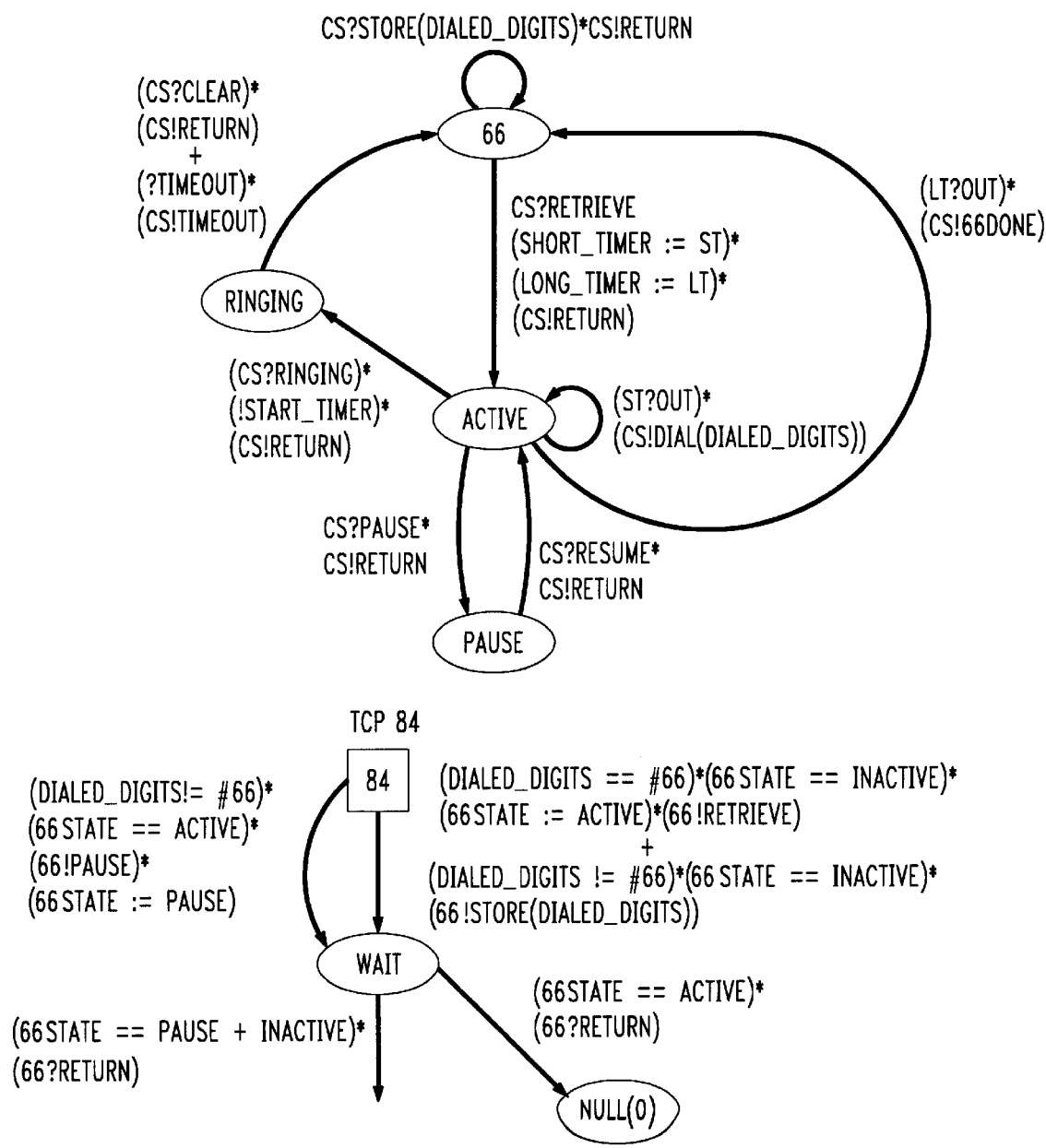
FIG. 12 is a diagram of the state machine for a repeat dial service according to the present invention.
Figure 12:
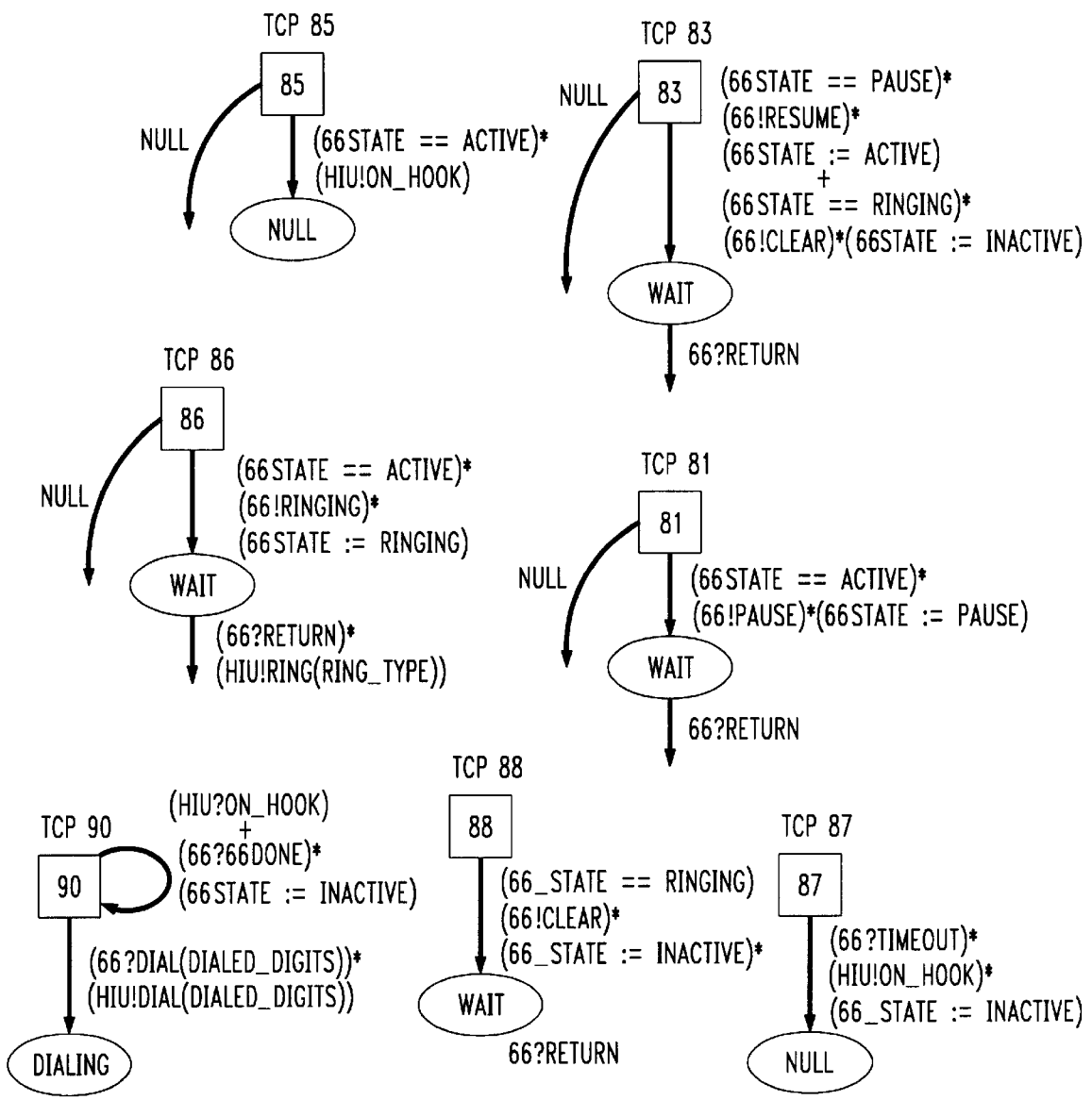

The repeat dial service allows a user to request that the last number that they dialed the repeatedly re-dialed until the call is completed. This service is useful in cases in which a user is attempting to call a party whose line is busy. In one embodiment, the user activates this service by entering the digits #66 in the present embodiment. The state machines for one embodiment of this service and modifications to the call server state machine tcps are shown in FIG. 12. As shown, the service logic for this service is invoked under many circumstances: when a user places a call, when a user activates the service, when a internal timer expires, and when a user initiates or receives a call when the service is active.

When a user places a call, control is passed to the repeat dial logic from tcp 84 of the call server state machine (66!store(dialed_digits)). The service logic stores the dialed number and returns control to tcp 84 which allows the transition in the call server state machine to complete.

When a user activities the repeat dial service, control is again passed to the service logic from tcp 84. At this point, the call server state machine has received an outgoing call request along with the dialed digits. If the dialed digits are #66, tcp 84 passes control to the repeat dial service logic (66!retrieve). The repeat dial service logic sets timers and enters the active state. The short timer period is the period at which the repeat dial server attempts to call the requested number, and the long time period is the time that the repeat dial service remains active before it gives up. The repeat dial logic the returns control to tcp 84 which returns the call server state machine to the null state.

From the null state, three valid events can occur. First, the repeat dial server short timer can expire, causing the repeat dial logic to request that the call server place an outgoing call to the repeat dial number previously store (cs!dial (dialed_digits)). This interaction takes place from tcp 90 which is embedded in the null state of the call server machine. If the called party is busy, tcp 85 commands the home interface unit to release the connection (hiu!on_hook, shown in FIGS. 8 and 12), and transitions to the null state. If the called party number rings, control is passed to the repeat dial logic through tcp 86 (66!ringing). The repeat dial server enters its ringing state, sets a timer, and returns control to tcp 86. Tcp 86 then rings the local phone (hiu!ring (ring_type)) and transitions to the ringing state of the call server. The timer in the repeat dial state machine is set to ensure that if neither party answers the call, the connection is eventually released (coordinated from tcp 87). If and when the call is completed, i.e., both sides answer, tcp 88 triggers (66!clear), and the repeat dial state machine transitions to its 66-state as its task has been completed.

The second event that may occur from the null state of the call server machine is that an incoming call arrives for the user that activated the repeat dial service. In this case, control is passed to the repeat dial server from tcp 81 (66!pause). The repeat dial server cancels its timer and enters the pause state. It returns control to tcp 81 and the call proceeds normally until the call server state machine enters tcp 83. At this point, the call server machine is transitioning to its null state. Tcp 83 passes control to the repeat dial server (66!resume) which restarts its timer, enters the active state, and returns control to tcp 83.

The third event that may occur from the null state of the call server machine is that the user that invoked the repeat dial services places another call. In this case, control is passed to the repeat dial logic from tcp 84 (66!pause). The processing for this case is similar for the case of the incoming call examined above, and can be traced from the illustrative embodiments shown in FIGS. 8 and 12.

Although an embodiment of a state machine for the home interface unit is not shown, its general operation is described. In general, the home interface unit performs some rudimentary digit analysis to reduce the communication required between itself and the call sever. That is, the home interface unit monitors the dialed digits until a complete correct sequence has been entered (either the correct code for a service invocation, speed dial code, or valid number of digits for a local or long distance telephone call). It then sends the complete dial string to the call server in a single SETUP$_O$ message. In one embodiment, the home interface unit forwards each dialed digit to the call server as it is entered. Although this requires many more packets to be sent from the home interface unit to the call server, it can easily be implemented in a system wherein the communication overhead between the home interface unit and call server is not a concern. Otherwise, this processing logic can be moved to the call server, thus simplifying the home interface unit.

It is apparent from the modifications made to the tcps of the call server machine for each services described above, that many interactions between these services exist. These interactions may create problems that must be considered in the design of the state machines as described above. That is, the call server state machine must have provisions for dealing with problems that may arise in the event that two or more of these services interact. To illustrate the various methods for alleviating such problems, possible interactions between the repeat dial service and the automatic call back service are described below.

Figure 13:
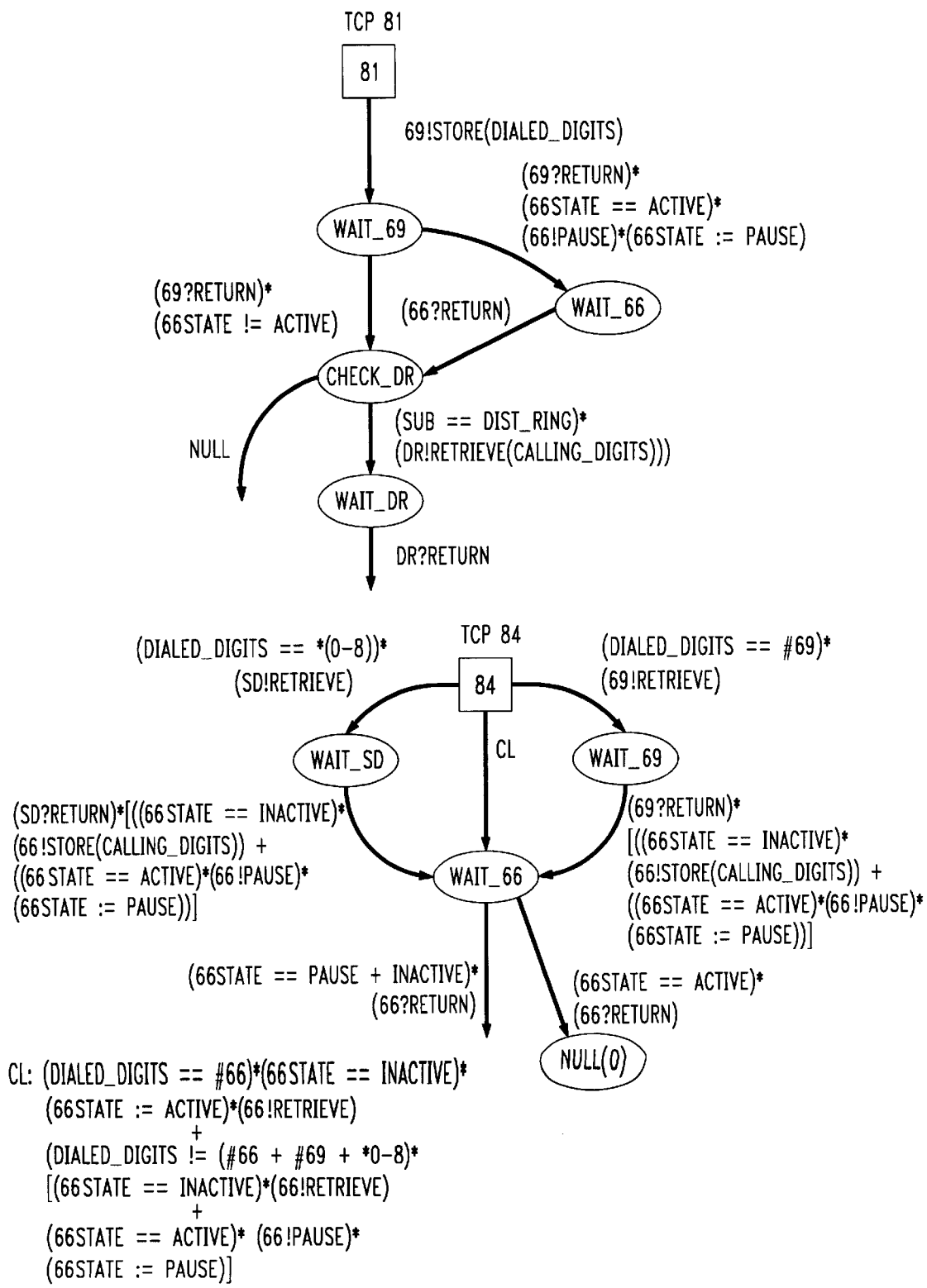
FIG. 13 is a graphical view of the service logic for the interaction of services shown in FIGS. 9–12.

One method for handling the interactions between the repeat dial service and the automatic call back service is illustrated in FIG. 13. As shown, the automatic call back logic is first invoked, and after the correct dialed_digits variable has been set, the repeat dial logic which stores the correct number is invoked. This eliminates any chance of storing the wrong digits as the last dialed number.

An interaction may also occur between the speed dial and the repeat dial services. As such, the problems associated with such interactions may be resolved or handled in the same way as described above (i.e. from tcp 84) and shown in FIG. 13. Other interactions with the repeat dial service may occur when the service logic is in the active state and when the outgoing calls are placed with either the automatic call back or speed dial services. These interactions, for example, can be resolved through the composite tcp 81 shown in FIG. 13.

Figure 14:
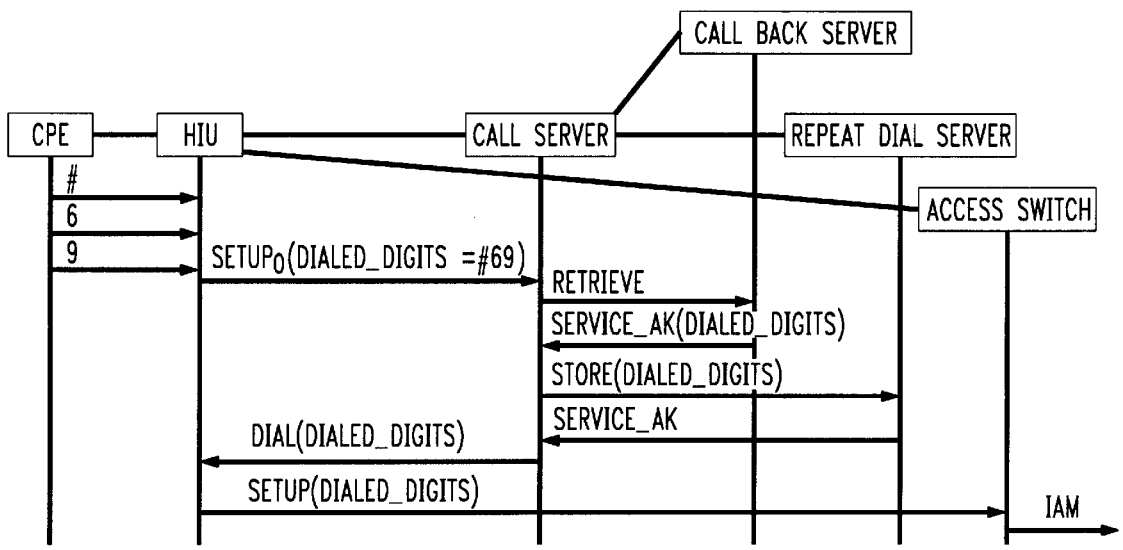
FIG. 14 shows the signaling flow for the case when a subscriber activates the automatic callback service shown in FIG. 9.

FIG. 14 shows the flow for the case in which the user dials #69 to activate the automatic call back service. In this example, a previous call has already been received by this user. Thus, a number has been stored by the automatic call back server. Assuming that the state machines for the call server and each service specific server are executing on separate processors, when the user enters the digits #-6–9 on the CPE, they are first forwarded to the home interface unit. The home interface unit recognizes the digits as a valid dial code and generates a SETUP$_O$ message to the call server containing the service code as the dialed digits. The call server recognizes the automatic call back service invocation and generates a RETRIEVE message to the automatic call back server. This server returns the correct dialed digits to the call server. At this time, the call server generates a STORE message containing the dialed digits to the repeat dial server, so that if at a later time the user invokes this service the correct digits have been stored. After the repeat dial server has stored the dialed digits, the call server instructs the home interface unit to dial the correct dial string (DIAL(dialed_digits)), and the call proceeds normally.

Figure 15:
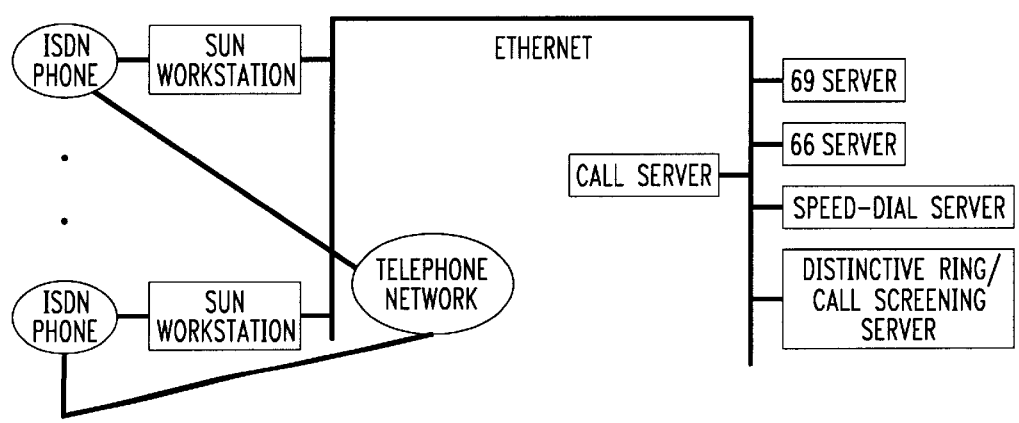
FIG. 15 shows an implementation of the present inventive architecture.

The direct signaling system of the present invention can be implemented in C++ using the Unix System Laboratories (USL) Standard Components, as shown in FIG. 15. As shown, the system executes on Sun Sparcstations under either SunOS or Solaris. The ISDN phones are AT&T model 8510T. These phones provide an applications programmer's interface (API), a serial port connection through which they may be controlled, and a connection to the telephone network. The API and serial port are used to allow the Sun Workstations to act as home interface units. Any events that arrive to the ISDN phone, either through its keypad or network connection, are captured and sent to the home interface unit through the serial port. The home interface unit then interacts with the call server over the ethernet. As a result, the home interface unit controls the actions of the ISDN phone, such as enabling its ringer with a certain ring pattern, or commanding it to dial a number.

To communicate, the direct signaling link and network use an ethernet. The direct signaling link can be replaced with various types of links, such as an internet connection, second telephone line, or Cellular Digital Packet Data (CDPD) link. In this embodiment, the USL finite state machine (Fsm) is modified to implement the home interface unit, call server, and repeat dial server. These servers required a significant amount of state information as can be seen from FIGS. 8 and 12. The remaining servers (automatic call back, speed dial, and distinctive ring) provide only store and retrieve functions, and were simpler to implement. All communication between the servers was implemented using the G2 library of USL standard components. G2 was used because it is media and machine independent and allows us to easily create and modify messages and their parameters. In a deployed direct signaling system, these libraries could be replaced with a streamlined protocol implementation.

In order to allow the easy introduction and modification of services in the direct signaling system, the state machine executing the call server is implemented using finite state machine classes executed in the present invention. The home interface unit and call server use the MFsm class, and the tcps use the TFsm class. The MFsm class supports additional functions such as communication and message passing. The TFsm class allows tcps to access the parent call server state machine. To add or modify a new service, any affected tcps are modified in isolation of the state machine software. This minimizes the number of points at which the system software requires modification to support new services.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A direct signaling telecommunication system having switching equipment for communicating user information between initiating and receiving subscriber premises equipment, comprising:
   at least one call server, each call server invoking and coordinating all services provided to predetermined subscriber premises equipment, each said call server being physically separate from the switching equipment of the system; and
   at least one home interface unit, each home interface unit electrically coupled to a predetermined subscriber premises equipment and a predetermined call server to provide separate control and routing of signaling information and user information between said subscriber premises equipment, said call server and a predetermined transport provider network;
   wherein said call servers are electrically coupled to a predetermined number of service specific servers, each said service specific server providing predetermined services to said subscriber premises equipment through machine logic which is executed at the direction of said call servers, so that said call servers provide said subscriber premises equipment with predetermined services independent of transport provider network services.

2. The system of claim 1 wherein each said call server is connected to a predetermined home interface unit through a direct signaling link.

3. The system of claim 2 wherein said direct signaling link is a communication link selected from the group consisting of a Cellular Digital Packet Data (CDPD) link, an internet connection, a cable TV link, a packet network link, a phone line and a wireless network.

4. The system of claim 1 wherein said machine logic is processed through said call servers.

5. The system of claim 1 wherein said machine logic is processed through an independent processor.

6. The system of claim 1 wherein the system further comprises an access telecommunication switch for providing basic switching functions to the subscribers, said switching function including routing and transporting subscriber user information.

7. The system of claim 6 wherein each said home interface unit is electrically coupled to a telecommunication switch through a transport network link.

8. The system of claim 6 wherein each said call server is electrically coupled to a telecommunication switch through a signaling link.

9. The system of claim 1 wherein said home interface unit performs digit analysis on information from said subscriber premises equipment.

10. The system of claim 1 wherein said home interface unit intercepts messages from said subscriber premises equipment to a provider network.

11. The system of claim 1 wherein the system further comprises at least one service specific server to execute predetermined service logic programs that provide predetermined services to the subscribers.

12. The system of claim 11 wherein said call servers and said service specific servers communicate through a server signaling link.

13. The system of claim 12 wherein said server signaling link is a packet network.

14. The system of claim 13 wherein said packet network is a Signaling System No. 7 network.

15. The system of 11 wherein said predetermined services include automatic call back, distinctive ring, speed dial, and repeat dial.

16. The system of claim 11 wherein said call server operates according to a call server state machine that controls communications with said home interface unit and said service specific servers, said state machine having trigger control points that trigger said call server to invoke a service logic machine in said service specific servers to provide the subscriber with a predetermined service.

17. The system of claim 16 wherein said service logic of said automatic call back service enables a subscriber to automatically call the last number from which an incoming call was received.

18. The system of claim 17 wherein said service logic for said automatic call back service stores a phone number of a calling party when a first trigger control point is executed in said call server state machine, and retrieves said stored phone number when a second trigger control point is executed in said call server state machine, said first trigger control point being reached when said call server receives an incoming call indicator signal and said incoming phone number; and said second control point being reached when said call server receives an outgoing call request with the digits #69.

19. The system of claim 16 wherein said service logic of said distinctive ring service enables a subscriber to prespecify a ring pattern for calls incoming from predetermined numbers.

20. The system of claim 19 wherein said distinctive ring service logic provides a predetermined distinctive ring to the subscriber when a predetermined trigger control point is executed on said call server state machine, said predetermined trigger control point being executed when said call server receives an incoming call request from a party having said predetermined number.

21. The system of claim 16 wherein said service logic of said speed dial service provides a subscriber with the facility to call a party by entering a predetermined alias for that party.

22. The system of claim 21 wherein said speed dial service logic expands said alias into a full number and completes the call when a predetermined trigger point on said call server is executed, said predetermined trigger point being executed when the subscriber dials digits that correspond to a predetermined set of speed dial codes.

23. The system of claim 16 wherein said service logic of said repeat dial service provides a subscriber with the facility to request that the last number dialed by the subscriber be repeatedly re-dialed until the call is completed.

24. The system of claim 23 wherein said repeat dial service logic repeatedly re-dials the last number dialed by the subscriber when a predetermined trigger point on said call server is executed, said predetermined trigger point being executed when the subscriber dials the digits #66.

25. The system of claim 16 wherein said trigger control points of said call server are independently modifiable to provide new services to the subscribers with substantially minimal change to the system.

26. A direct signaling telecommunication system having switching equipment for communicating user information between initiating and receiving subscriber premises equipment, comprising:

a home interface unit for terminating transport connections and signaling connection to a predetermined subscriber premises equipment, said home interface unit electrically coupled to said predetermined subscriber premises equipment;

a call server electrically coupled to said predetermined subscriber premises equipment, said call server invoking and coordinating all services provided to said predetermined subscriber premises equipment, said call server being physically separate from the switching equipment of the system;

an access telecommunication switch electrically coupled to said home interface unit and at least one other switch; and a plurality of service specific servers electrically coupled to said call server for providing said predetermined services to said subscriber premises equipment;

wherein said home interface unit provides separate control and routing of signaling information and user information between said subscriber premises equipment, said call server and a predetermined transport provider network and further wherein said predetermined number of service specific servers electrically coupled to said call server are arranged to provide predetermined services to said subscriber premises equipment through machine logic which is executed at the direction of said call servers, so that said call servers provide said subscriber premises equipment with predetermined services independent of transport provider network services.

27. The system of claim 25 wherein said call server is electrically coupled to said access telecommunication switch through a signaling link.

* * * * *